United States Patent
Klang et al.

(10) Patent No.: US 7,482,290 B2
(45) Date of Patent: Jan. 27, 2009

(54) METHOD FOR ADHERING FABRIC TO RUBBER, TREATED FABRIC, AND FABRIC-RUBBER COMPOSITES

(75) Inventors: Jeffrey Allan Klang, West Chester, PA (US); Joseph Burke, Moon Township, PA (US)

(73) Assignee: Sartomer Technology Company, Inc., Wilmington, DE (US)

( * ) Notice: Subject to any disclaimer, the term of this patent is extended or adjusted under 35 U.S.C. 154(b) by 175 days.

(21) Appl. No.: 11/128,946

(22) Filed: May 13, 2005

(65) Prior Publication Data

US 2005/0255773 A1    Nov. 17, 2005

Related U.S. Application Data

(60) Provisional application No. 60/571,056, filed on May 14, 2004.

(51) Int. Cl.
*B32B 27/12* (2006.01)
(52) U.S. Cl. .................... 442/149; 442/152; 442/164; 442/172; 442/178; 442/179; 442/180
(58) Field of Classification Search ............ 442/149, 442/152, 164, 172, 178, 179, 180
See application file for complete search history.

(56) References Cited

U.S. PATENT DOCUMENTS

| 4,009,227 | A | | 2/1977 | Tazuma et al. | |
|---|---|---|---|---|---|
| 4,015,317 | A | * | 4/1977 | Johnsen | 28/166 |
| 4,137,282 | A | | 1/1979 | Otsuki et al. | |
| 4,176,110 | A | | 11/1979 | Otsuki et al. | |
| 4,403,058 | A | * | 9/1983 | Dohi et al. | 524/397 |
| 4,760,105 | A | * | 7/1988 | Fuller et al. | 523/420 |
| 5,300,569 | A | * | 4/1994 | Drake et al. | 525/78 |
| 5,739,232 | A | * | 4/1998 | Hazell et al. | 526/240 |
| 2002/0162627 | A1 | * | 11/2002 | Dunlap | 156/307.1 |
| 2004/0002562 | A1 | | 1/2004 | Schmidhauser | |

OTHER PUBLICATIONS

Chemical Abstracts Search dated Aug. 12, 2005 including search strategy and search results.

* cited by examiner

*Primary Examiner*—Andrew T Piziali
(74) *Attorney, Agent, or Firm*—Michael B. Fein; Cozen O'Connor

(57) ABSTRACT

Compositions comprising maleinized imide polymer and α,β-ethylenically unsaturated carboxylic, the polymer selected from the group consisting of butadiene homopolymer, butadiene copolymers, isoprene homopolymer, isoprene copolymers. and poly(maleic anhydride-co-alkenyl benzenes), are disclosed. Maleinized imide resin, optionally in solution and optionally comprising metallic salt of α,β-ethylenically unsaturated carboxylic acid, is used to treat fabric and thereby improve fabric to rubber adhesion. The resultant treated fabric and fabric-rubber composite are also disclosed.

11 Claims, No Drawings

METHOD FOR ADHERING FABRIC TO RUBBER, TREATED FABRIC, AND FABRIC-RUBBER COMPOSITES

CROSS REFERENCE TO RELATED APPLICATION

Benefit of Provisional Application 60/571,056, filed May 14, 2004, is claimed

BACKGROUND OF THE INVENTION

This invention relates to adhesive compositions and methods, particularly to adhesive compositions for bonding rubber to fabric, reinforcing rubber compounds with fabric, and compositions of rubber bonded to fabric with adhesive compositions.

Reinforced rubber goods are used in a wide variety of consumer and industrial applications. The performance of reinforced molded rubber goods depends on the adhesion of the reinforcement to the rubber. Fabrics made with synthetic yarns tend to be difficult to bond to rubber. In practice several things are done to improve adhesion. As the fibers are drawn a spin finish is applied which may contain an adhesion activator such as an epoxy resin. The yarn may be heat set before or after weaving to relax the orientation put into the fiber by drawing and avoid shrinkage during the rubber bonding curing step. Shrinkage during this step will adversely effect adhesion. Finally, to get good bonding to rubber, an adhesive dip coat is applied to the fabric.

A typical dip coat process to apply adhesive to fabric may involve many steps and is tailored to each application, i.e., a different adhesive may be used depending on the fabric type and the rubber it is to be molded with. Some of the steps may include a pretreatment dip of the fabric with a polyisocyanate dissolved in a solvent. The fabric is then dried and put through a forced air oven to cure the coating and heat set the fabric. This operation may be followed by a subsequent dip treatment in a resin-reinforced latex (RFL) bath, and a second trip through the oven. The composition of these baths may include the addition of other adhesive promoters such as epoxies, phenolics, or the like. An RFL bath is made by preparing a 6% resin solution of resorcinol and formaldehyde or other methylene donor in water. This solution is allowed to react for a certain time at a specified pH and temperature and is then poured into a rubber latex, and the blend is again allowed a certain time to "mature" before using. U.S. Pat. No. 3,307,966, assigned to E.I. DuPont describes such a process.

In practice these types of RFL dip adhesives have several drawbacks, including the following. The shelf life of the adhesive composition depends on several factors including pH, temperature and the exact ingredients and is difficult to control. Typical shelf life can vary from one day to one month after which the material must be disposed of. It is also difficult to test whether or not the RFL adhesive has drifted out of its useful property range. Batch to batch variation is also a problem. Environmental and safety issues are a concern. The adhesives are dried and cured at high temperature (up to 200° C.). In addition to the high energy usage there are emissions of solvents, formaldehyde and other materials. Finally, performance of the RFL adhesive in the end use application is often inadequate. The goal is to have cohesive failure of the rubber matrix rather than adhesive failure at the rubber-fabric interface with the RFL adhesives; this is often only achievable by addition of other additives to the rubber.

DETAILED DESCRIPTION

We have discovered certain materials and methods for treatment of fabric to improve fabric to rubber adhesion while avoiding the drawbacks of the prior art mentioned above. In one aspect the invention comprises a method of treating fabric by applying a composition comprising maleinized imide polymer to the fabric, the polymer being selected from the group consisting of butadiene homopolymer, butadiene copolymers, isoprene homopolymer, isoprene copolymers, and poly(maleimide-co-alkenyl benzenes).

In another aspect the invention is rubber-fabric composite made using the composition and method of the invention.

Another aspect of the invention is a composition comprising a solution of the maleinized imide polymer and a metal salt of an $\alpha,\beta$-ethylenically unsaturated carboxylic acid.

The maleinized imide polymer can be applied to the fabric either neat or from solution. Either organic solvent or water based solutions can be used. Water based solutions are preferred.

Preferably, a water solution of the maleinized imide polymer is formed by neutralizing the basic nitrogen present in the system with an acid to form a solution which is used in the treatment process. Optionally, at least one metal salt of an $\alpha,\beta$-ethylenically unsaturated carboxylic acid may be used in conjunction with the such solution. Additives such as surfactants may also be included as needed. The concentration of the soluble imide salt can range from about 1% to about 90% and is preferably in the range of about 10% to about 50%. The concentration of the soluble metal salt can be about 0 to 90%, preferably about 10-50%, by weight, based on the solution.

Application of the adhesive to the fabric can be done by any conventional method, for example, dip coating, spray application or roller application.

The maleinized imide polymers of the invention are made by reaction of a maleinized resin with a primary/tertiary amine using known methods. The molecular weight, microstructure, and maleic anhydride content of the maleinized resin can be optimized by routine methods. The number average molecular weight of the maleinized resin is preferably less than about 20,000 Daltons and more preferably from about 1000 to about 10,000 Daltons. The resin can be a butadiene homopolymer, a butadiene copolymer, an isoprene polymer, an isoprene copolymer, or a poly(maleic anhydride copolymer-co-alkenyl benzene) resin such as styrene-maleic anhydride copolymer (SMA). The butadiene polymer and copolymers can have 1,2- to 1,4-butadiene units in a ratio of about 1:99 to about 95:1 1,2-butadiene to 1,4 butadiene units. The ratio of cis to trans 1,4-butadiene units can be 100:1 to 1:100. The maleic anhydride content in the resin can range from about 1 to about 50 wt % and more preferably from about 5 to about 30 wt %. Copolymers of butadiene and isoprene with one or more other monomers, for example styrene, substituted styrene, vinyl cyclohexene, acrylate and methacrylate esters, dicyclopentadiene, norborene, and the like, can be maleinized and imidized. Copolymers of butadiene with substituted dienes such as isoprene are also suitable in the maleinized resin.

The acid used to neutralize the basic nitrogen of the maleinized resin imide can be strong or weak and organic or inorganic in nature. Examples include, but are not limited to, hydrochloric acid, sulfuric acid, phosphoric acid, alkyl or aryl sulfonic acids, and carboxylic acids such as acetic acid, propionic acid, benzoic acid, acrylic acid, methacrylic acid, citric acid, and lactic acid.

The amine used to make the imide consists of a material containing one primary amine group capable of forming a cyclic imide and one or more tertiary amine groups and is referred to herein as "primary/tertiary amine." The primary/tertiary amine may be aliphatic, cycloaliphatic, or aromatic in nature. Other functional groups can be present on the primary/tertiary amine to the extent that they do not interfere with the formation of the cyclic imide or its solubility in water. Examples of suitable primary/tertiary amines include, but are not limited to: N,N-dimethylaminopropyl amine, aminopropylmorpholine, N,N-dibutylaminopropyl amine, N,N-diisopropylaminoethyl amine, N,N-diethylaminopropyl amine, and N,N-dimethylaminoethyl amine.

The composition optionally may include a metallic salt of an $\alpha,\beta$-ethylenically unsaturated carboxylic acid. The $\alpha,\beta$-ethylenically unsaturated carboxylic preferably consists of methacrylic acid or acrylic acid or combinations thereof. The metallic counterion can consist of a mono-, di-, tri-, tetra-, or higher valent ion. Examples include, but are not limited to: lithium, sodium, potassium, calcium, zinc, magnesium, barium, berylium, aluminum, titanium, zirconium, iron, copper and silver.

Synthetic or natural fiber fabrics can be treated. Synthetic fabrics such as polyester, polyamide, polyurethane, nylon, polypropylene, carbon fiber, metallic fibers, and fiberglass are all suitable. Fabrics based on natural fibers such as cotton, silk or wool and fabrics made from blends of two or more types of fibers are also suitable.

The type of rubber used is not critical and can include any natural or synthetic rubber used in this art, including but not limited to EPDM (ethylene propylene diene rubber), BR (butadiene rubber), IR (isoprene rubber), NBR (nitrile rubber), HNBR (hydrogenated nitrile rubber), SBR (styrene butadiene rubber), CR (chloropene rubber), XIIR (halobutyl rubber), UR (urethane rubber), and blends and copolymers of these rubbers.

The reinforced rubber goods made by the methods of the invention can be used in a variety of end use applications, including, but not limited to, automotive hoses and belts, conveyor belts, power transmission belts, automotive air bags, flexible printing blankets, engine mounts, tires, and other reinforced molded rubber products.

The compositions of the invention comprising a solution of a maleinized imide polymer and a metal salt of an $\alpha,\beta$-ethylenically unsaturated carboxylic acid can be prepared by blending an aqueous solution of the imide or mixtures of imides with an aqueous solution of one or more metal salts or $\alpha,\beta$-ethylenically unsaturated acids. The imide solution preferably comprises an acid which functions to neutralize the imide, for example, acetic acid. The weight ratio of imide polymer to metal salt can be 1:99 to 99:1, with the preferred ratio range being about 80:20 to 40:60.

The imide-metal salt solutions can be used in applications other than for adhering fabric to rubber, for example the treatment of fiberglass or carbon fiber reinforcements to improve the properties of composite structures, use as an adhesive for bonding of substrates such as metal, plastic, wood, paper, glass or fabrics to themselves or other materials. These solutions can also be used for non-adhesive applications such as dispersants to improve the compatibility and dispersion of fillers into elastomers, the filled elastomer being used to produce tires, belts, hoses or other articles; coatings for metals, plastics, glass, wood, paper, or other substrates.

Such coatings can be applied from water or solvent solution or by electrophoretic deposition.

The following examples, in which all parts are by weight unless otherwise indicated; illustrate a few, non-limiting, embodiments of the invention.

EXAMPLES

Example 1

Preparation of a Maleinized Polybutadiene Imide

A 1 liter flask fitted with a mechanical stirrer, thermocouple and nitrogen sparge tube was charged with a maleinized polybutadiene resin (Ricon 131MA17 brand available from Sartomer Company) (368.7 gm), xylenes (385.2 gm) and N,N-dimethylaminopropyl amine (71.6 gms). The mixture was heated to reflux to remove water. Once water production stopped, the xylene was distilled off and the temperature was allowed to rise to 160° C. and held until no more volatiles were collected. The final product had an acid value of 2 mg KOH/gm and viscosity at 60° C. of 6200 cPs.

Example 2

Preparation of Maleinized Polybutadiene Imide Acetate Adhesive Solution, 15% active in water A solution was prepared with ingredients set forth in Table 1.

TABLE 1

| a) Ingredients | Dry Weight | Wet Weight |
| --- | --- | --- |
| Deionized water | 0 | 557 |
| Maleinized polybutadiene imide of Ex. 1 | 100 | 100 |
| Glacial Acetic Acid | 0 | 9.7 |
| Totals | 100 | 667 |

The deionized water and acetic acid were added to a quart paint can, placed on a hot plate and warmed to about 60° C. The maleinized polybutadiene imide was added slowly while stirring. Stirring was continued while the temperature was held at about 60° C. The solution was complete in about 4 hours.

Example 3

Coating of Fibers

The maleinized polybutadiene imide acetate solution was used to coat nylon, polyester and aramid woven fabrics. Samples of polyester, and nylon woven fabrics, were roller coated with the solution at a rate of 9 oz/yd$^2$, and allowed to dry in a hood at room temperature. The fabrics were then hooked onto a stretch frame and cured in an air oven at 200° C. for 90 seconds. After cooling the weight of the adhesive on the fabric was calculated as a weight gain measured from the uncoated weight of the fabric. An aramid woven tape, 2 inches wide was also treated in the same way. The % weight gain is reported in Table 2.

TABLE 2

| Fabric | % weight gain |
|---|---|
| Polyester | 6.2 |
| Nylon | 9.9 |
| Aramid | 6.6 |

Example 4

Preparation of EPDM Masterbatch

An EPDM molding compound was prepared as follows. The first 5 items in Table 3 were mixed into a "masterbatch." The peroxide was added on a two roll mill.

TABLE 3

EPDM Molding Compound

| Ingredients | Weight in grams |
|---|---|
| EPDM* | 100 |
| Carbon Black, N 660 | 100 |
| Alipihatic oil, Sunpar 2280 | 50 |
| Zinc Oxide | 5 |
| Stearic Acid | 1 |
| Dicumyl peroxide, Luperox DC40-KEP | 7.5 |

*amorphorus ethylene (55%)-propylene (40%)-ethylidene norbornene (5%) terpolymer, Nordel IP 4640 brand

Example 5

Preparation of Testing of EPDM Rubber Fabric Composites

T-Peel adhesion test specimens were prepared as follows. The EPDM rubber compound was sheeted on a two roll mill to about 0.030 inches thick. The three fabrics of Example 4, i.e, the polyester, nylon and aramid, were tested with EPDM rubber according to the following procedure. Three strips were cut from the EPDM sheet, about 1.75 inches wide by 4 inches long. The exam strips were interleaved with two strips of the treated fabric, 2 inches wide by 5 inches long. About 1 inch of one end of each of the treated fabric samples was not covered with rubber. An aluminum foil strip was placed in these end areas to prevent rubber from bonding to the fabric. The end areas were later used to peel and place the separate parts of the composite in opposite ends of a tensile testing machine. The composites were molded in a heated platen press for 40 minutes at 320° F. (160° C.).

After molding, the samples were allowed to cool and relax for one day, and then tested for adhesive strength. A one inch wide strip was die cut from each sample. The separated ends of the samples were placed in a tensile testing machine and pulled apart at 5 inches/minute. The force to pull the composite apart was recorded. The results are summarized in the table below. The "force," reported in lb/in, is that required to pull the one inch wide sample apart; the "% cohesive failure" is the percentage of the area in which the rubber tore and left approximately even thicknesses of rubber bonded to the two fabric strips. The T. Peel Adhesion results are reported in Table 4

TABLE 4

(Comparative)
T-Peel Adhesion Results

| Treated Fabric | Polyester | Nylon | Aramid |
|---|---|---|---|
| Force, lb/in | 20 | 5 | 17 |
| % Cohesive Failure | 0 | 0 | 0 |

Example 6

Preparaton of Zinc Diacrylate-Acetate Solution Blends Treated Fabrics and Adhesion Testing Thereof The procedures described in Example 2 were followed except that acetate adhesive treating solutions were increased in concentration to 20% active. Ingredients for the maleinized polybutadiene solution are reported in Table 5 and ingredients for the metal salt solution are reported in Table 6.

TABLE 5

| Ingredients | Dry Weight | Wet Weight |
|---|---|---|
| Deionized water | 0 | 390.3 |
| Maleinized polybutadiene imide of Ex. 1 | 100 | 100 |
| Glacial Acetic Acid | 0 | 9.7 |
| Totals | 100 | 500 |

TABLE 6

B.

| Ingredients | Dry Weight | Wet Weight |
|---|---|---|
| Deionized water | 0 | 200 |
| Zinc diacrylate | 50 | 50 |
| Totals | 50 | 250 |

The solution was filtered to remove the residual zinc oxide.

Blends of these two solutions were made at varying ratios, with the amount of the zinc diacrylate solution in the blend reported in Table 7. Both polyester and nylon woven fabrics were treated, cured, molded and tested in the manner described in Example 2. The results are reported in the Table 7. The weight of adhesive on each of these specimens was between 4.4%-5.5%, and on average 5% by weight.

TABLE 7

T-Peel Adhesion Results

| % Zinc Diacrylate in | Polyester | | Nylon | |
|---|---|---|---|---|
| the adhesive | Force, lb/in | % cohesive | Force, lb/in | % cohesive |
| 0* | 19 | 0 | 3 | 0 |
| 10 | 22 | 0 | 10 | 0 |
| 20 | 27 | 0 | 20 | 0 |
| 30 | 27 | 0 | 7 | 0 |
| 40 | 35 | 40 | 24 | 0 |
| 50 | 47 | 80 | 13 | 0 |

*comparative.

Example 7

Adhesion Composition Added to EPDM Rubber and Composites with Polyester and Nylon Fibers The coating procedures described in Example 5 were followed. The treating solution was prepared from the maleinized polybutadiene imide prepared in Ex. 1, and the acetate solution was 20% active. Adhesion promoters were added to the EPDM rubber compound. A first comparative adhesion promoter is a polybutadiene resin with 17% by weight of adducted maleic anhydride (Ricobond 1731 brand). A second adhesion promoter (Invention) is a dispersion of zinc diacrylate in EPM rubber at about 75% (SR 75EPM 2A brand). Each of these adhesion promoters was added to the rubber compound on the two roll mill at 7 active phr, (parts per hundred of rubber). A comparative compound with no adhesion promoter was also tested. T-Peel Adhesion results were reported in Table 8.

TABLE 8

| | T-Peel Adhesion Results | | | |
|---|---|---|---|---|
| | Polyester | | Nylon | |
| Adhesion Promoter | Force, lb/in | % Cohesive Failure | Force, lb/in | % Cohesive Failure |
| None* | 21 | 10 | 5 | 0 |
| Ricobond 1731* | 35 | 40 | 32 | 50 |
| SR 75 EPM 2A+ | 35 | 50 | 37 | 100 |

*comparative
+invention

Example 7

Imide-Zinc Diacrylate Adhesive Solution and Rubber Fabric Composites

The procedures as in Example 6 were followed. A combination of treating Solutions was used: NTX 6715 acetate and zinc diacrylate both at 20% active. The zinc diacrylate was 25% in the blend of adhesive solutions. And as in Example 6, the same adhesion promoters were added to the EPDM rubber compound and T-Peel testing results are reported in Table 9.

TABLE 9

| | T-Peel Adhesion Results | | | |
|---|---|---|---|---|
| | Polyester | | Nylon | |
| Adhesion Promoter | Force, lb/in | % Cohesive Failure | Force, lb/in | % Cohesive Failure |
| None* | 44 | 100 | 35 | 60 |
| Ricobond 1731* | 34 | 15 | 39 | 100 |
| SR 75 EPM 2A+ | 37 | 100 | 37 | 100 |

*comparative
+invention

These results demonstrate that the polybutadiene imide acetate solution, optionally blended with a zinc diacrylate solution, is a very good treatment for fabrics to be bonded to rubber. The treated fabrics are further improved by the addition of adhesion promoters in the rubber.

Example 8

UV Cured Acetate-Zinc Acrylate

The maleinized polybutadiene imide, acetate/zinc diacrylate solution blend of Example 7 was modified for UV curing instead of the thermal curing in the previous examples. There was 25% zinc diacrylate in the adhesive blend. Into 50 grams of the 20% NTX 6715 acetate/zinc diacrylate solution blend 0.78 grams of KIP-EM photoinitiator was blended, approximately 1.5% wet on wet. Uncoated polyester and nylon fabrics were heat set for 90 seconds at 200° C. and then coated with the UV modified adhesive solution. The fabrics were then UV cured in an ASHDEE unit with 2 lamps at 300 watts/in at 50 ft/min. There were 2 passes on both front and back of the fabrics. The pick up weights of the adhesive were Polyester 10.6% and Nylon 11.3%. The treated fabrics were then molded with EPDM compounds as in the previous examples and tested for adhesion with results reported in Table 10.

TABLE 10

| | T-Peel Adhesion Results | | | |
|---|---|---|---|---|
| | Polyester | | Nylon | |
| Adhesion Promoter | Force, lb/in | % Cohesive Failure | Force, lb/in | % Cohesive Failure |
| None* | 20 | 0 | 28 | 30-40 |
| Ricobond 1731* | 23 | 0 | 42 | 70-80 |
| SR 75 EPM 2A+ | 15 | 0 | 35 | 50-60 |

*comparative
+invention

While the invention has been described and illustrated in detail herein, various modifications, alternatives, improvements, and alterations should be readily apparent to those skilled in this art without departing from the spirit and scope of the invention.

What is claimed is:

1. Fabric prepared by (A) treating the fabric or a fiber comprising the fabric with a composition comprising an aqueous solution of a maleinized imide polymer wherein the polymer is selected from the group consisting of butadiene homopolymer, butadiene copolymers, isoprene homopolymer, isoprene copolymers and poly(maleic anhydride-co-alkenyl benzenes) wherein said maleinized imide polymer is in the form of an acid/base salt in an aqueous solution prepared by addition of an acid of sufficient strength to protonate basic sites in the maleinized imide; and a metal salt of an $\alpha,\beta$-ethylenically unsaturated carboxylic acid: and (B) drying the treated fabric or fiber.

2. The fabric of claim 1 where the acid is selected from the group consisting of hydrochloric acid, sulfuric acid, phosphoric acid, alkyl sulfonic acid, aryl sulfonic acid, carbonic acid, formic acid, acetic acid, propionic acid, benzoic acid, acrylic acid, methacrylic acid, citric acid, oxalic acid, and lactic acid.

3. The fabric of claim 1 where the composition comprises an $\alpha,\beta$-ethylenically unsaturated carboxylic acid metal salt where the carboxylic acid is selected from the group consisting of acrylic acid, methacrylic acid, crotonic acid, tiglic acid, cinnamic acid and combinations thereof and the metal is selected from the group consisting of lithium, sodium, potassium, calcium, zinc, magnesium, barium, berylium, aluminum, titanium, zirconium, iron, copper, silver and combinations thereof.

4. The fabric of claim 1 where the composition is applied to the fabric by spraying, dip coating, extrusion, or roller coating.

5. The fabric of claim 1 wherein the fabric or fiber comprising the fabric is selected from the group consisting of polyester, polyamide, polyurethane, cotton, rayon, silk, wool, nylon, polypropylene, fiberglass, carbon fibers, metallic fibers, and blends thereof.

6. A reinforced rubber article, comprising the fabric of claim 1 laminated and molded with a rubber and cured.

7. The reinforced rubber article of claim 6 where the rubber is selected from the group consisting of natural rubber, EPDM (ethylene propylene diene rubber), EPM (ethylene propylene rubber), BR (butadiene rubber), JR (isoprene rubber), NBR (nitrile rubber), HNBR (hydrogenated nitrile rubber), SBR (styrene butadiene rubber), CR (chloropene rubber), XIIR (halobutyl rubber), UR (urethane rubber), blends, and copolymers thereof.

8. The rubber article of claim 6 where the rubber is cured by free radical initiator or sulfur curatives.

9. The rubber article of claim 6 where the rubber is cured by peroxide.

10. The fabric of claim 1 wherein the metal salt is zinc diacrylate.

11. The fabric of claim 1 wherein after the fabric or fiber is treated with the composition, the fabric or fiber is heat treated at a temperature of up to about 240° C.

* * * * *